(12) United States Patent
Li et al.

(10) Patent No.: US 12,386,565 B2
(45) Date of Patent: Aug. 12, 2025

(54) METHOD AND DEVICE FOR DATA STORAGE BASED ON REDUNDANT ARRAY OF INDEPENDENT DISKS

(71) Applicant: SAMSUNG ELECTRONICS CO., LTD., Suwon-si (KR)

(72) Inventors: Peiwei Li, Suwon-si (KR); Ruyi Zhang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/365,104

(22) Filed: Aug. 3, 2023

(65) Prior Publication Data

US 2024/0419368 A1   Dec. 19, 2024

(51) Int. Cl.
*G06F 3/06* (2006.01)

(52) U.S. Cl.
CPC .......... *G06F 3/0685* (2013.01); *G06F 3/0611* (2013.01); *G06F 3/0616* (2013.01); *G06F 3/0619* (2013.01); *G06F 3/0656* (2013.01)

(58) Field of Classification Search
None
See application file for complete search history.

(56) References Cited

U.S. PATENT DOCUMENTS

| | | | | |
|---|---|---|---|---|
| 6,128,762 A * | 10/2000 | Jadav | ............... | G06F 11/1076 |
| | | | | 714/766 |
| 7,849,356 B2 | 12/2010 | Jones et al. | | |
| 10,474,527 B1 * | 11/2019 | Sun | ............... | G06F 11/1068 |
| 10,664,346 B2 | 5/2020 | Mehra et al. | | |
| 10,896,089 B2 * | 1/2021 | Helmick | ............... | G06F 11/1076 |
| 2010/0269017 A1 * | 10/2010 | Bueb | ............... | G06F 11/1048 |
| | | | | 714/763 |
| 2014/0208156 A1 * | 7/2014 | Muralimanohar | .... | G06F 3/0673 |
| | | | | 714/6.24 |
| 2020/0004630 A1 * | 1/2020 | Jaquette | ............... | G06F 11/2094 |
| 2020/0264800 A1 * | 8/2020 | Wysocki | ............... | G06F 3/0688 |
| 2020/0363998 A1 | 11/2020 | Walker et al. | | |
| 2020/0387446 A1 * | 12/2020 | Kim | ............... | G06F 12/0882 |
| 2021/0081273 A1 | 3/2021 | Helmick et al. | | |

* cited by examiner

*Primary Examiner* — Stephanie Wu
(74) *Attorney, Agent, or Firm* — MORGAN, LEWIS & BOCKIUS LLP

(57) ABSTRACT

A method of data storage based on a redundant array of independent disks (RAID), where the RAID includes a plurality of solid state drives (SSD), each SSD including a persistent memory region (PMR) and a NAND, includes writing first data into the NAND, and writing first check data into the PMR. The first check data is check data related to the first data.

16 Claims, 11 Drawing Sheets

FIG. 6

METHOD AND DEVICE FOR DATA STORAGE BASED ON REDUNDANT ARRAY OF INDEPENDENT DISKS

CROSS-REFERENCE TO RELATED APPLICATIONS

This application claims priority under 35 U.S.C. § 119 to Chinese Patent Application No. 202310706580.5 filed on Jun. 14, 2023, the disclosure of which is incorporated by reference herein in its entirety.

TECHNICAL FIELD

Embodiments of the present disclosure relate to computer storage, and more particularly, to a method and device for data storage based on a redundant array of independent disks (RAID).

DISCUSSION OF RELATED ART

A redundant array of independent disks (RAID), also generally referred to as a disk array, combines a plurality of independent high-performance disk drives into a disk subsystem, thereby providing higher storage performance and data redundancy than a single disk.

In a RAID including solid state drives (SSDs), data and check data are stored in a flash memory NAND of each SSD in the array. Therefore, whenever a write operation is issued to the SSD array, a read-modify-write (RMW) process occurs. This process can include multiple input/output (I/O) operations and check data calculations, and the check data updates may involve data interactions between a host and the NAND in the SSD, resulting in long operation paths and high latency. In addition, frequent NAND updates may quickly consume the programming/erasing (P/E) cycles of the SSD, which may thus shorten the lifespan of the SSD.

SUMMARY

Embodiments of the present disclosure provide a method and device for data storage based on a redundant array of independent disks (RAID) which utilizes a persistent memory region (PMR) of each solid state drive (SSD) in the RAID as a cache for check data, which may increase otherwise low read/write performance and increase otherwise short lifespan of the associated storage devices.

According to an example embodiment of the present disclosure, a method of data storage based on a RAID is provided. The RAID includes a plurality of SSDs, where each SSD includes a PMR and a flash memory NAND. The method of data storage includes writing first data into the NAND, and writing first check data into the PMR, where the first check data is check data related to the first data.

In an example embodiment, before writing the first data into the NAND, the method of data storage includes reading second data in the NAND, and reading second check data. The second check data is check data related to the second data, and the second data is data overwritten by the first data after the first data is written into the NAND. The method further includes calculating the first check data based on the second data, the second check data and the first data.

In an example embodiment, reading the second check data includes reading the second check data from the PMR when the second check data is in the PMR, and reading the second check data from the NAND when the second check data is not in the PMR.

In an example embodiment, when the second check data is not in the PMR and a cache occupancy of the PMR is greater than or equal to a cache threshold, data in the PMR satisfying a predetermined condition is written into the NAND.

In an example embodiment, calculating the first check data includes calculating a first xor result between the second data and the second check data, and calculating a second xor result of the first xor result with the first data, as the first check data.

According to an example embodiment of the present disclosure, a RAID includes a plurality of SSDs. Each SSD includes a PMR and a NAND. The NAND is configured to store first data. The PMR is configured to store first check data. The first check data is check data related to the first data.

In an example embodiment, second data is read in the NAND, second check data is read, the second check data is check data related to the second data, and the second data is data overwritten by the first data after the first data is written into the NAND. The first check data is calculated based on the second data, the second check data and the first data.

In an example embodiment, the second check data is read from the PMR when the second check data is in the PMR, and the second check data is read from the NAND when the second check data is not in the PMR.

In an example embodiment, when the second check data is not in the PMR and a cache occupancy of the PMR is greater than or equal to a cache threshold, the data in the PMR satisfying a predetermined condition is written into the NAND.

In an example embodiment, a first xor result between the second data and the second check data is calculated, and a second xor result between the first xor and the first data is calculated as the first check data.

According to an example embodiment of the present disclosure, a system to which a RAID is applied includes a main processor, a memory, and the RAID, where the RAID is configured to perform the method of data storage as described above.

According to an example embodiment of the present disclosure, a host storage system includes a host, and a RAID, where the RAID is configured to perform the method of data storage as described above.

According to an example embodiment of the present disclosure, a data center system includes a plurality of application servers and a plurality of storage servers. Each storage server includes a RAID, where the RAID is configured to perform the method of data storage as described above.

According to an example embodiment of the present disclosure, a computer readable storage medium is provided, having a computer program stored thereon, where the method of data storage as described above is implemented when the computer program is executed by a processor.

According to the method and device of data storage based on a RAID according to example embodiments of the present disclosure, the PMR of each SSD in the RAID is used as a cache for check data, which may reduce accesses to the NAND, and increase the read/write performance of the RAID by using the PMR's own memory-level read/write speed and the high performance of internal transfer of data between the PMR and the NAND. The reduction in the number of the NAND accesses may also reduce the number of programming/erasing (P/E) cycles of NAND particles, which may extend the lifespan of the SSD. In addition, due to the power failure protection mechanism of the PMR, data is not lost in the case of abnormal power failure, which may increase the data reliability.

BRIEF DESCRIPTION OF THE DRAWINGS

The above and other features of the present disclosure will become more apparent by describing in detail embodiments thereof with reference to the accompanying drawings.

DETAILED DESCRIPTION

Figure 1:
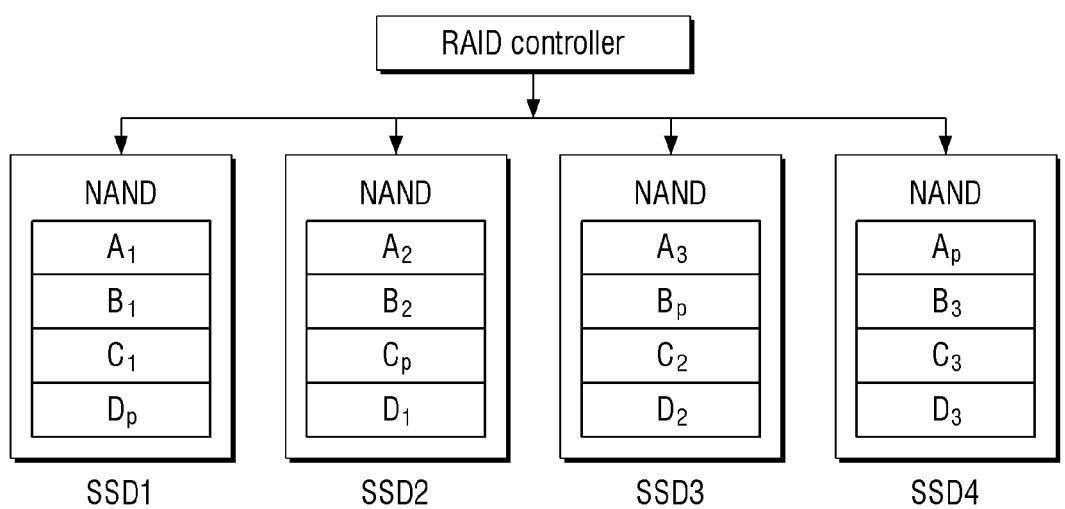
FIG. 1 exemplarily illustrates a schematic diagram of a solid state drive (SSD) redundant array of independent disks (RAID).

Embodiments of the present disclosure will be described more fully hereinafter with reference to the accompanying drawings. Like reference numerals may refer to like elements throughout the accompanying drawings.

It should be noted that the terms "first", "second", etc. in the specification and claims of the disclosure and the accompanying drawings above are used to distinguish similar objects rather than to describe a particular order or sequence. It should be understood that data so distinguished may be interchanged, where appropriate, so that embodiments of the disclosure described herein may be implemented in an order other than those illustrated or described herein. Embodiments described in the following examples do not represent all embodiments that are consistent with the disclosure. Rather, they are only examples of devices and methods that are consistent with some aspects of the disclosure, as detailed in the appended claims.

It should be noted herein that "at least one of the several items" in this disclosure includes "any one of the several items", "any combination of the several items" and "all of the several items" the juxtaposition of these three categories. For example, "including at least one of A and B" includes the following three juxtapositions: (1) including A; (2) including B; (3) including A and B. Another example is "performing at least one of operation one and operation two", which means the following three juxtapositions (1) performing operation one; (2) performing operation two; (3) performing operation one and operation two.

In the era of hard disk drives (HDDs), the performance gap between a storage device and a central processing unit (CPU) of a computer was large, and the I/O performance of the storage device was low. Moreover, a single disk was highly susceptible to failure, thus resulting in the potential of data loss. Hence, redundant array of independent disks (RAID) technology was introduced to combine a plurality of independent disks together to form a large disk system, thus achieving better storage performance and higher reliability than a single disk.

Currently, a flash-based solid state drive (SSD) has become an emerging alternative to the HDD. An SSD offers higher read/write performance and a more secure and stable form than an HDD, and one SSD may often provide nearly the same performance as a plurality of HDD RAIDs. Although an SSD is more reliable than an HDD, an SSD is still subject to failure, thereby leading to the emergence of an SSD RAID including plurality of SSDs. An SSD RAID stores redundant information of user data, and when one of the SSDs fails, the redundant information can be used to rebuild the user data and further enhance the performance of the SSD RAID. As a result, SSD RAIDs are increasingly being deployed in data centers. Compared to an HDD RAID, an SSD RAID significantly improves storage density and I/O performance, and reduces power consumption and rack space.

Among the existing types of RAID technology, RAID-5 is the most used level today due to its combination of storage performance, data security, and storage cost. For a RAID-5 including N (N>=3) disks, the RAID-5 controller divides the data into N−1 pieces and writes them into N−1 disks concurrently, and writes the check data of the data to these N disks. The data and the corresponding check data are stored on each disk constituting the RAID-5, and the data and the corresponding check data are stored on separate disks. If one disk is damaged, the remaining data and the corresponding check data may be used to recover the damaged data.

FIG. 1 exemplarily illustrates a schematic diagram of an SSD RAID.

In FIG. 1, referring to an SSD RAID-5 as an example, the SSD RAID-5 may include a plurality of SSDs, and data and check data are stored in the NAND flash memory of each SSD. The SSD RAID-5 stores data and check data in the form of data slices, and the check data of each data slice is calculated as follows: $A_P = A_1$ xor $A_2$ xor $A_3$ ... xor $A_n$, wherein $A_1, A_2, A_3 ... A_n$ are the data blocks, $A_P$ is the check data, and xor is the exclusive or operation, where n is a positive integer. Referring to FIG. 1, only four SSDs are shown in FIG. 1, for example, SSD1, SSD2, SSD3, and SSD4, and the plurality of SSDs can be controlled by a RAID controller, where each SSD includes the NAND. In an SSD RAID-5 system as shown in FIG. 1, a plurality of (e.g., four) data slices are stored, and one data slice includes three data blocks (e.g., $A_1, A_2, A_3$) and one check data (e.g., $A_P$), which are stored in the NAND of each of the four SSDs, respectively. The check data (e.g., $A_p, B_p, C_p, D_p$) are not always stored in a same SSD, but may be stored in the NAND of each SSD, for example, in a cyclic manner.

FIG. 1 also illustrates data blocks $B_1, B_2, B_3$ and check data $B_p$, data blocks $C_1, C_2, C_3$ and check data $C_p$, and data blocks $D_1, D_2, D_3$ and check data $D_p$.

It should be understood that the above schematic diagram of the SSD RAID is only exemplary, and that the storage method of data and check data in the above schematic diagram is also only exemplary, and the disclosure is not limited thereto.

Figure 2:
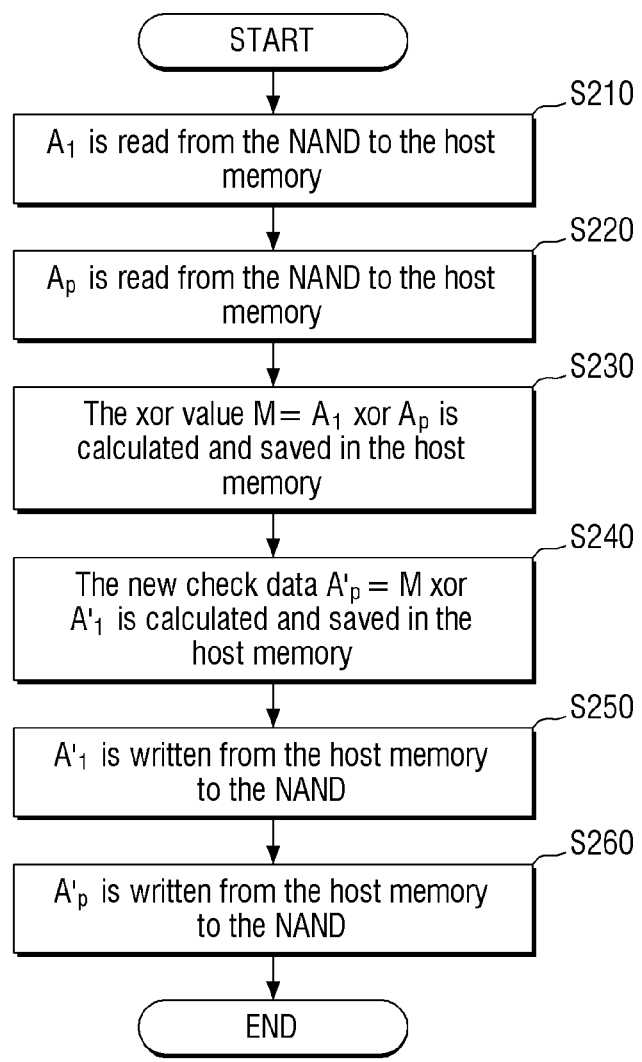
FIG. 2 illustrates a flowchart of an SSD RAID based data update process.

FIG. 2 illustrates an SSD RAID based data update process.

In the case of SSD RAID-5, the data and check data are stored in the NAND of each SSD in the array, and the check data may be parity data. Therefore, whenever a write operation is issued to the SSD array, there is a read modify write (RMW) process. If a new data $A'_1$ (e.g., data block $A'_1$) is written at this time, the following operations may be performed.

In operation S210, the old data $A_1$ is read from the NAND of the SSD to the host memory.

In operation S220, the old check data $A_P$ is read from the NAND of the SSD to the host memory.

In operation S230, the xor value $M=A_1$ xor $A_P$ is calculated and saved in the host memory.

In operation S240, the new check data $A'_p=M$ xor $A'_1$ is calculated and saved in the host memory.

In operation S250, the new data $A'_1$ is written from the host memory to the NAND of the SSD.

In operation S260, the new check data A'p is written from the host memory to the NAND of the SSD.

The SSD RAID based data update process illustrated in FIG. 2 above may also include the operation of the new data $A'_1$ being sent to the host memory at the beginning of the process. From the data update process shown in FIG. 2, it can be seen that whenever there is a data update in the data slice, it will cause an update of the check data. For a RAID-5 with N SSDs, where N is a positive integer, 4 (N−1) I/O operations and 2(N−1) check data calculations are performed, and the update of the check data involves data interaction between the host and the SSD NAND. This process may have long operation paths and long latency. Therefore, the above SSD RAID-5 may have two issues: (1) frequent long latency interactions that lead to poor performance of the SSD RAID-5 architecture, and (2) frequent NAND updates that rapidly consume the programming/erasing (P/E) cycles of the SSD, thereby shortening the lifespan of the SSD.

Figure 3:
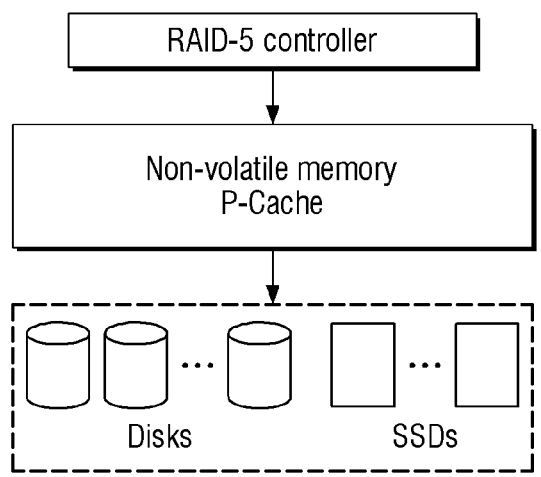
FIG. 3 illustrates a schematic diagram of a hybrid disk array with additional non-volatile memory.

FIG. 3 illustrates a schematic diagram of a hybrid disk array with additional non-volatile memory.

Referring to FIG. 3, a method of adding additional non-volatile memory (P-Cache) for caching the check data of the RAID-5 is described. Although this method may reduce NAND writes, issues may occur in which (1) additional non-volatile memory chips are implemented to cache the parity data of RAID-5, which may be costly, and (2) data transfer between the non-volatile memory chip and SSD may utilize assistance from host memory, which may involve high transfer overheads and long latency.

To address these issues, embodiments of the present disclosure provide a method and device for data storage based on a redundant array of independent disks (RAID), in which the persistent memory region (PMR) of each SSD in the RAID is used as a cache for check data to reduce access to the NAND, and to increase the read/write performance of the redundant array of independent disks by using the PMR's own memory-level read/write speed and the high performance of internal transfer of data between the PMR and NAND. Also, the reduction in the number of NAND accesses may reduce the number of programming/erasing (P/E) operations of NAND particles, which may extend the lifespan of the SSD. In addition, due to the power failure protection mechanism of the PMR, according to example embodiments, data is not lost in the case of abnormal power failure, which may increase data reliability.

Hereinafter, a method and device for data storage based on RAID according to example embodiments of the present disclosure will be described with reference to FIGS. 4 to 13.

Figure 4:
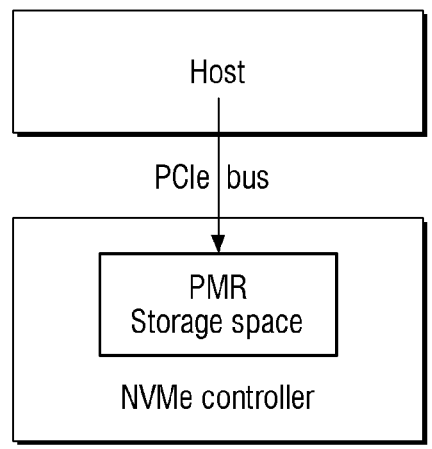
FIG. 4 illustrates a schematic diagram of a persistent memory region (PMR) according to an example embodiment.

FIG. 4 illustrates a schematic diagram of a PMR according to an example embodiment.

Referring to FIG. 4, the PMR is a memory region within the SSD that has a dedicated power failure protection capacitor that allows data in the PMR to be safely flushed to the NAND in the event of an unexpected power failure, and thus, is a general purpose non-volatile memory region within the SSD. This memory region may also be mapped to the address space of the PCI Express (PCIe) bus, making it accessible to hosts and other devices in the form of memory.

Figure 5:
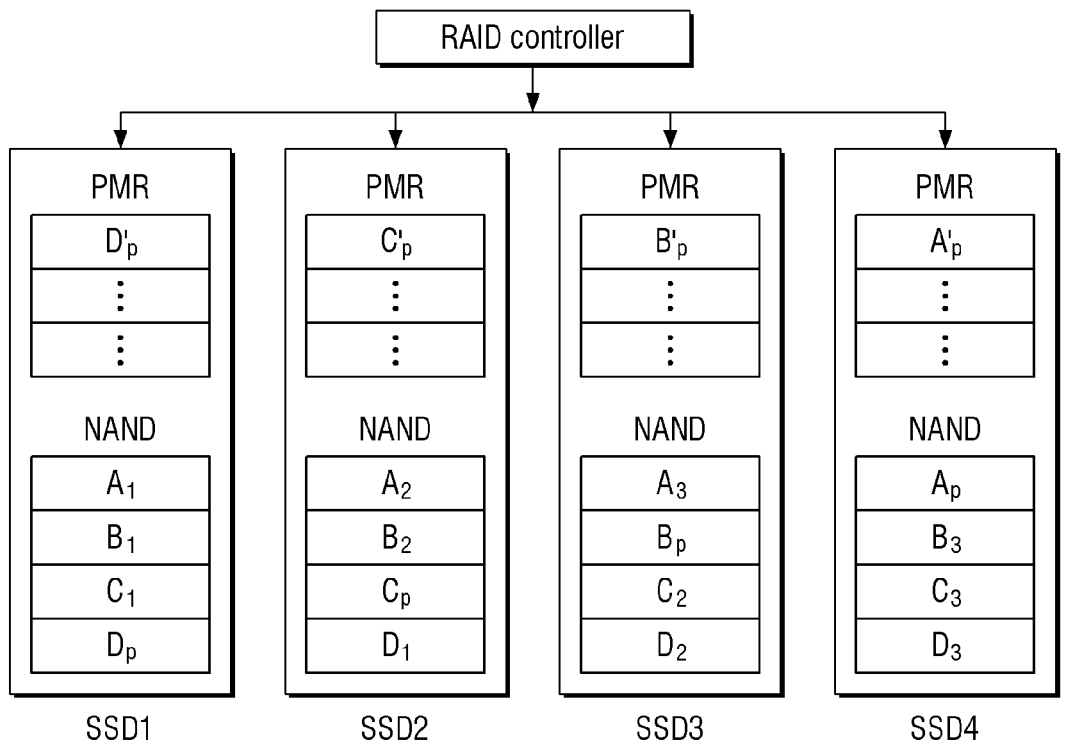
FIG. 5 illustrates an architectural diagram of an SSD RAID according to an example embodiment.

FIG. 5 illustrates an architectural diagram of an SSD RAID according to an example embodiment.

The SSD RAID architecture in FIG. 5 is based on SSD RAID-5. The SSD RAID (hereinafter also abbreviated as RAID) architecture may include a plurality of SSDs (only four are shown in FIG. 5, SSD1, SSD2, SSD3, and SSD4, however embodiments are not limited thereto), and the plurality of SSDs may be controlled by a RAID controller, where each SSD includes a PMR and a NAND. Referring to FIG. 5, in the SSD RAID-5 system, a plurality of (e.g., 4) data slices are stored therein. One data slice includes three data blocks (e.g., $A_1, A_2, A_3$) and one check data (e.g., $A_P$), which are stored respectively in the NANDs of the plurality of SSDs. The check data (e.g., $A_p, B_p, C_p, D_p$) is not stored always in a same SSD, but rather, may be stored in the NAND of each SSD, for example, in a cyclic manner as shown in FIG. 5. The PMR in the SSD acts as a cache for the check data, caching the check data in the NAND of the SSD to which it belongs. For example, the PMR in SSD1 caches the check data stored in the NAND in SSD1 (e.g., $D_p$, which is cached by the PMR as $D'_p$).

FIG. 5 also illustrates data blocks $B_1, B_2, B_3$ and check data $B_p$, data blocks $C_1, C_2, C_3$ and check data $C_p$, and data blocks $D_1, D_2, D_3$ and check data $D_p$. In addition, in FIG. 5, the PMR in SSD2 caches the check data stored in the NAND in SSD2 (e.g., $C_p$, which is cached by the PMR as $D'_p$), the PMR in SSD3 caches the check data stored in the NAND in SSD3 (e.g., $B_p$, which is cached by the PMR as $B'_p$), and the PMR in SSD4 caches the check data stored in the NAND in SSD4 (e.g., $A_p$, which is cached by the PMR as $A'_p$).

It should be understood that the above RAID architecture based on SSD RAID-5 is only exemplary, and the storage method of data and check data in the above architecture is also only exemplary, and embodiments of the present disclosure are not limited thereto.

Figure 6:
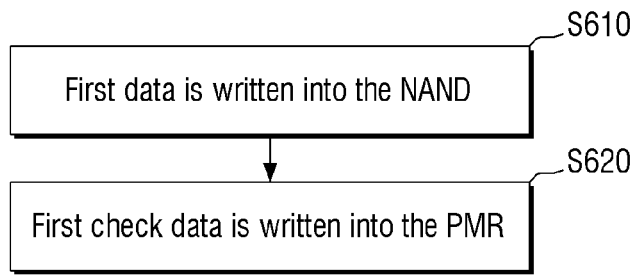
FIG. 6 illustrates a flowchart of a method of data storage based on a RAID according to an example embodiment.

FIG. 6 illustrates a flowchart of a method of data storage based on a RAID according to an example embodiment. The RAID includes a plurality of SSDs, where each SSD includes a persistent memory region PMR and a flash memory NAND.

In operation S610, first data is written into the NAND. The first data may be, for example, one or more data blocks in one data slice or may be, for example, data from one or more data slices.

According to an example embodiment, before the first data is written into the NAND, second data may be read in the NAND and second check data may be read, where the second check data is the check data related to the second data and the second data is the data which would be overwritten by the first data after the first data is written into the NAND. Then, the first check data may be calculated based on the second data, the second check data, and the first data. Here, the first data may be a new data block $A'_1$ which would be written into the data slice A (including a plurality of data blocks $A_1, A_2, A_3 \ldots A_n$) stored in the NAND, and the first data $A'_1$ would overwrite the old data block $A_1$ in the data slice A (including a plurality of data blocks $A_1, A_2, A_3 \ldots A_n$) after the first data $A'_1$ is written into the NAND, where the data block $A_1$ is the second data. Since each data slice corresponds to one check data and the second check data is the check data $A_p$ calculated from the old data block $A_1$ in the RAID, e.g. $A_p = A_1$ xor $A_2$ xor $A_3 \ldots$ xor $A_n$, then, after the first data (e.g. data block $A'_1$) is written into the NAND as new data to overwrite the second data (e.g., data block $A_1$), the check data corresponding to the data slice A is to be updated to obtain new check data, e.g., the first check data. The first check data is the check data $A'_p$ calculated from the new data block $A'_1$, e.g. $A'_p = A'_1$ xor $A_2$ xor $A_3$ Ar xor $A_n$. Further, the first check data $A'_p$ may be calculated based on the second data $A_1$, the second check data $A_p$, and the first data $A'_1$. In embodiments of the disclosure, the check data may be parity data, but is not limited thereto. Here, the first data may also be a plurality of new data blocks (e.g., $A'_1, A'_2, \ldots A'_m$) which would be written to the data slice A stored in the NAND and correspondingly overwrite a plurality of old data blocks (e.g., the second data) in the data slice A. At this time, the first check data is the check data calculated from the plurality of new data blocks, e.g., $A'_p = A'_1$ xor $A'_2$ xor $\ldots$ xor $A'_m$ xor $A_{m+1} \ldots$ xor $A_n$.

According to an example embodiment, a first xor result between the second data and the second check data may be calculated, then an xor result between the first xor result and the first data may be calculated as the first check data. The first data may be a new data block $A'_1$ which would be written into the data slice A (including a plurality of data blocks $A_1, A_2, A_3 \ldots A_n$) stored in the NAND, according to the nature of the xor operation (e.g., satisfying the mutative law, the associative law, and the reflexivity), then $A_2$ xor $A_3 \ldots$ xor $A_n = A_1$ xor $A_p$, where $A_1$ xor $A_p$ is the first xor result between the second data and second check data, and thus $A'_p = (A_1$ xor $A_p)$ xor $A'_1$ (e.g., the first check data is the xor result between the first xor result and the first data). In addition, the first data may also be a plurality of new data blocks (e.g., $A'_1, A'_2, \ldots A'_m$) which would be written to the data slice A stored in the NAND, then $A_{m+1}$ xor $A_{m+2} \ldots$ xor $A_n = A_1$ xor $A_2$ xor $\ldots$ xor $A_m$ xor $A_p$, where $A_1$ xor $A_2$ xor $\ldots$ xor $A_m$ xor $A_p$ is the first xor result between the second data and second check data, and thus $A'_p = (A_1$ xor $A_2$ xor $\ldots$ xor $A_m$ xor $A_p)$ xor $A'_1$ xor $A'_2$ xor $\ldots$ xor $A'_m$ (e.g., the first check data is the xor result between the first xor result and the first data).

According to an example embodiment, the second check data may be read from the PMR in the case that the second check data is in the PMR, and the second check data may be read from the NAND in the case that the second check data is not in the PMR. In the case that the second check data is not in the PMR and cache occupancy of the PMR is greater than or equal to a cache threshold, data in the PMR satisfying a predetermined condition may be written into the NAND. In embodiments of the disclosure, the PMR of each SSD in the RAID is used as the cache for the check data, when the second check data is read, if there is a cache hit, that is, in the case that the second check data is in the PMR, the second check data is read from the PMR. If there is a cache miss, that is, in the case that the second check data is not in the PMR, since the PMR only acts as the cache for the check data and the complete check data is stored in the NAND, the second check data is read from the NAND. In addition, in the case of the cache miss, it is possible that the cache is already full and some check data is to be written to NAND in time. Thus, the cache occupancy can be determined, and in the case that the cache occupancy of the PMR is greater than or equal to the cache threshold (e.g., about 80% of the cache of the PMR), the data in the PMR satisfying a predetermined condition is written to the NAND, and subsequent check data written into the PMR may overwrite the cache space corresponding to the data satisfying the predetermined condition to be written to the NAND. The data satisfying the predetermined condition in the PMR here may be, for example, the least frequently accessed data most recently in the PMR, but the disclosure is not limited thereto.

In operation S620, the first check data is written into the PMR, where the first check data is the check data related to the first data. In embodiments of the disclosure, the PMR of each SSD in the RAID is used as the cache for the check data, and the first check data calculated above (e.g., $A'_p = (A_1$ xor $A_p)$ xor $A'_1$ or $A'_p = (A_1$ xor $A_2$ xor $\ldots$ xor $A_m$ xor $A_p)$ xor $A'_1$ xor $A'_2$ xor $\ldots$ xor $A'_m$) is written into the PMR, the first check data may be written into the PMR and overwrite the cache where the second check data is located. In the case that the first data is the data of one or more data slices (e.g., the data of data slice B, including all data blocks $B_1, B_2, B_3 \ldots B_n$ in the data slice), the first check data can be the check data correspondingly calculated from all data blocks in one or more data slices (e.g., the check data calculated for data slice B is $B_p = B_1$ xor $B_2$ xor $B_3 \ldots$ xor $B_n$), and as the first check data, one or more corresponding calculated check data are written into the PMR.

According to an example embodiment as described above, the PMR of each SSD in RAID is used as a cache for the check data to reduce the access to the NAND, and to increase the read/write performance of the RAID by using the PMR's own memory-level read/write speed and the high performance of the internal transfer of data between the PMR and NAND. Also, the reduction in the number of NAND accesses also reduces the number of programming/erasing (P/E) operations on the NAND particles, which may extend the lifespan of the SSD.

Figure 7:
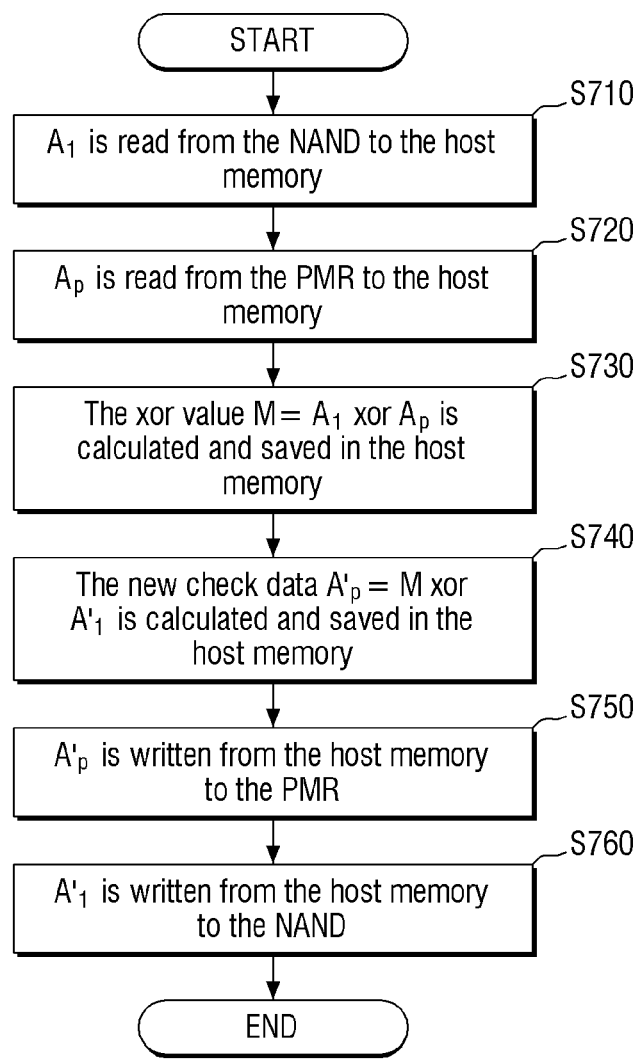
FIG. 7 illustrates a flowchart of a RAID based cache hit data update according to an example embodiment.

FIG. 7 illustrates a flowchart of a RAID based cache hit data update according to an example embodiment.

Based on the RAID architecture as shown in FIG. 5, new data $A'_1$ (e.g., the data block $A'_1$) is to be written into the NAND to overwrite the old data $A_1$ (e.g., the data block $A_1$) and the check data (old check data) of the data slice where the old data $A_1$ is located is $A_p$. In the case of a PMR cache hit, that is, in the case that the old check data (e.g., the second check data) is in the PMR, the data update process may be performed as follows:

In operation S710, the old data $A_1$ is read from the NAND of the SSD to the host memory.

In operation S720, the old check data $A_p$ is read from the PMR of the SSD to the host memory.

In operation S730, the xor value $M = A_1$ xor $A_p$ is calculated and saved in the host memory.

In operation S740, the new check data $A'_p = M$ xor $A'_1$ is calculated and saved in the host memory.

In operation S750, the new check data $A'_p$ is written from the host memory to the PMR of the SSD.

In operation S760, the new data $A'_1$ is written from the host memory to the NAND of the SSD.

The RAID based cache hit data update process illustrated in FIG. 7 may also include the operation of the new data $A'_1$ being sent to the host memory at the beginning of the process. It should be understood that the above operations may not only performed sequentially, but also may performed concurrently, or performed in an interchangeable order according to example embodiments.

Compared with the data update process shown in FIG. 2, when the old check data is in the PMR, that is, when there is a cache hit, it can be seen from the above process that:
1) Only 1 NAND read and 1 NAND write are performed, which may reduce the number of I/O operations for the NAND by about 50%, thus increasing the read/write performance of the RAID as well as reducing the number of programming/erasing (P/E) operations for NAND particles, which may extend the lifespan of the SSD.
2) The check data is located in the PMR, which provides memory-level read/write speeds to the host, and the read/write performance of the read/write of the check data may thus be increased. As a result, the read/write performance of the RAID may be increased.

Figure 8:
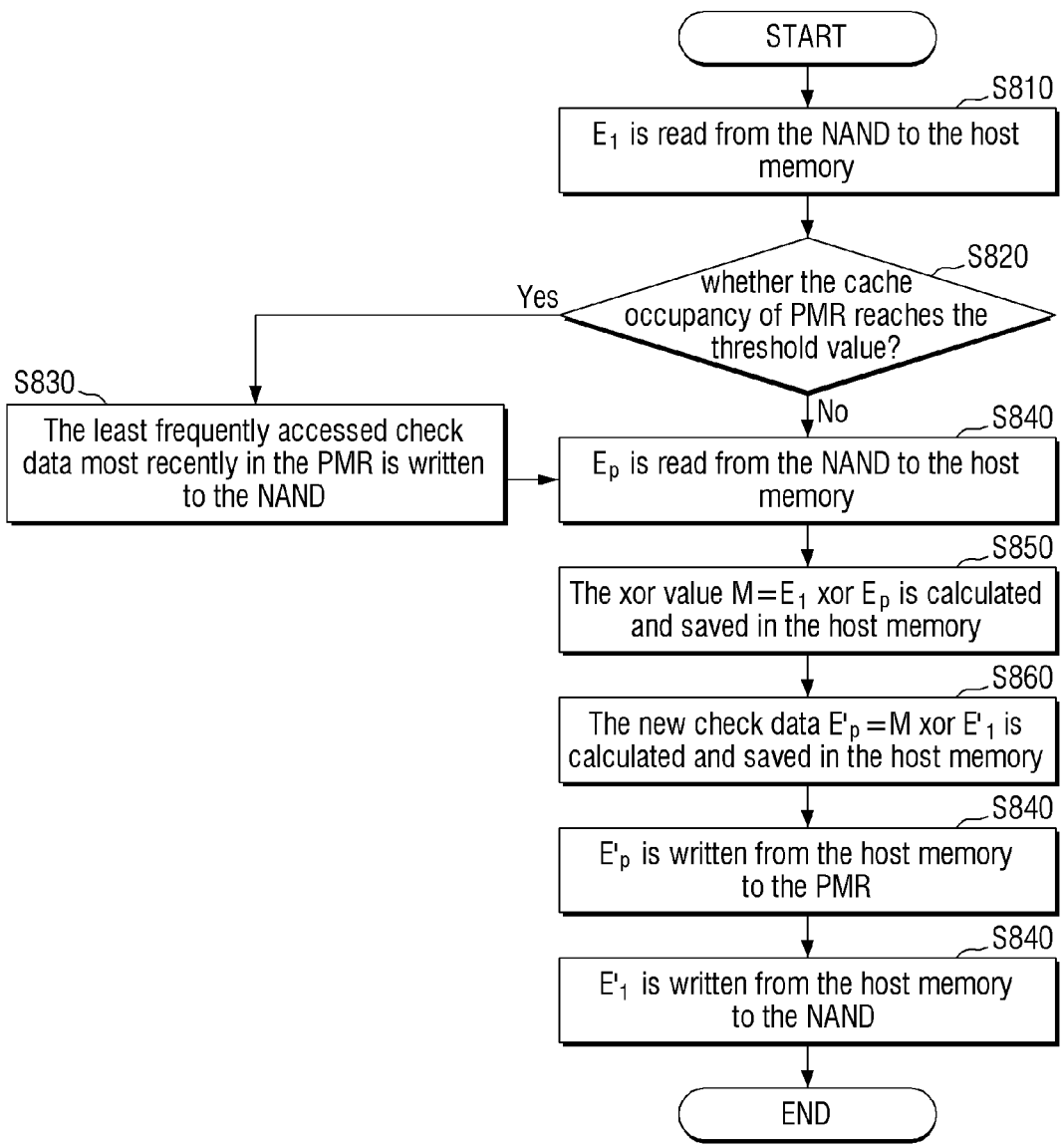
FIG. 8 illustrates a flowchart of a RAID based cache miss data update according to an example embodiment.

FIG. 8 illustrates a flowchart of a RAID based cache miss data update according to an example embodiment.

Based on the RAID architecture as shown in FIG. 5, in the case of a PMR cache miss, that is, the old check data (e.g., the second check data) is not in the PMR, it is possible that the PMR cache is full and some check data is to be written to the NAND in time. Thus, the data update flow may also include a cache determination and a write operation from the PMR to the NAND (operations S830-S840 described below). As a result, a new data $E'_1$ (e.g., data block $E'_1$) is to be written into NAND to overwrite the old data $E_1$, and in the case that the data slice in which the old data $E_1$ is located has a check data (old check data) of Ep, the data update process may be performed as follows.

In operation S810, the old data $E_1$ is read from the NAND of the SSD to the host memory.

In operation S820, whether the cache occupancy of PMR reaches the threshold value is determined. If yes, operation S830 is performed, otherwise, operation S840 is performed.

In operation S830, the least frequently accessed check data most recently in the PMR is written to the NAND.

In operation S840, the old check data $E_p$ is read from the NAND of the SSD to the host memory.

In operation S850, the xor value $M=E_1$ xor $E_p$ is calculated and saved in the host memory.

In operation S860, the new check data $E'_p=M$ xor $E'_1$ is calculated and saved in the host memory.

In operation S870, the new check data $E'_p$ is written from the host memory to the PMR of the SSD.

In operation S880, the new data $E'_1$ is written from the host memory to the NAND of the SSD.

The RAID based cache miss data update process illustrated in FIG. 8 may also include the operation of the new data E' being sent to the host memory at the beginning of the process. It should be understood that the above operations may not only performed sequentially, but also may performed concurrently, or performed in an interchangeable order according to example embodiments.

When the old check data is not in the PMR, that is, when there is a cache miss, it can be seen from the above process that: 2 reads to the NAND and 2 writes to the NAND are performed, but one write (operation S830) therein occurs only in a worst case scenario and is from the PMR space to the NAND, which is an internal data transfer of the SSD. Thus, the overall RAID write performance may still be increased.

Figure 9:
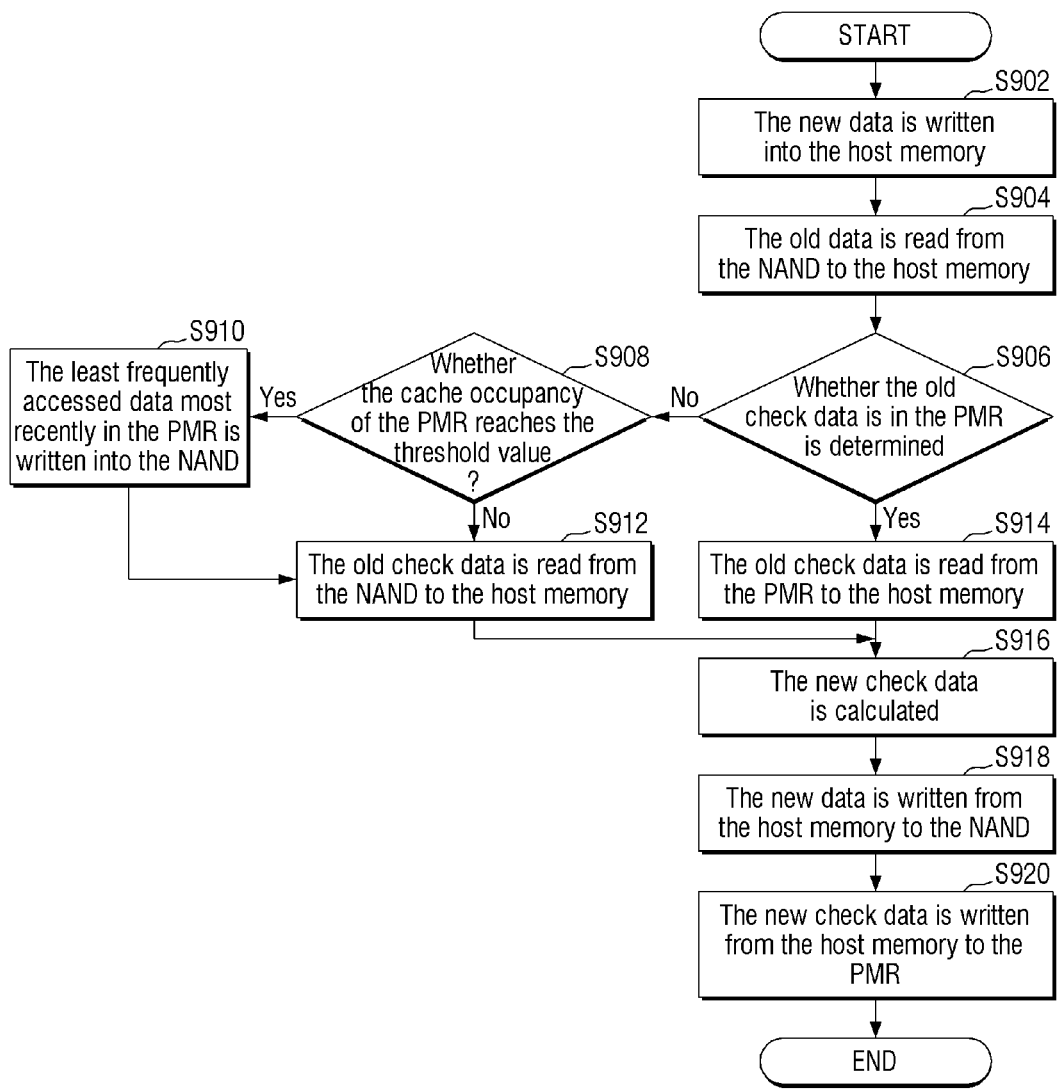
FIG. 9 illustrates a flowchart of a RAID based data update according to an example embodiment.

FIG. 9 illustrates a flowchart of a RAID based data update according to an example embodiment.

Based on the RAID architecture as shown in FIG. 5, new data (e.g., one or more data blocks in the same data slice) is to be written to the NAND to overwrite the old data, and the overall flow of data update is as follows.

In operation S902, the new data is written into the host memory.

In operation S904, the old data is read from the NAND of the SSD to the host memory.

In operation S906, whether the check data (e.g., the old check data) of this data slice is in the PMR is determined, where the data slice is the slice which would have data updated after being written by the new data. If yes, operation S914 is to be performed. In operation S914, the old check data is read from the PMR of the SSD to the host memory. Otherwise, Operations S908-S912 are performed. In operation S908, whether the cache occupancy of the PMR reaches the threshold value is determined. If yes, operation S910 is performed, otherwise operation S912 is performed. In operation S910, the least frequently accessed data most recently in the PMR is written into the NAND. In operation S912, the old check data is read from the NAND of the SSD to the host memory.

In operation S916, the new check data is calculated, where, for example, in the case that new data $A'_1$ (e.g., data block $A'_1$) is to be written into the NAND to overwrite the old data $A_1$ (e.g., data block $A_1$) and the check data (old check data) of the data slice where the old data $A_1$ is located is $A_p$, the xor value $M=A_1$ xor $A_p$ is calculated and saved in the host memory. Then, the new check data $A'_p=M$ xor $A'_1$ is calculated and saved in the host memory.

In operation S918, the new data is written from the host memory to the NAND of the SSD.

In operation S920, the new check data is written from the host memory to the PMR of the SSD.

It should be understood that the above operations may not only performed sequentially, but also may performed concurrently, or may performed in an interchangeable order according to example embodiments.

According to an example embodiment as described above, the PMR of each SSD in a RAID is used as a cache for the check data to reduce the access to the NAND, and to increase the read/write performance of the RAID by using the PMR's own memory-level read/write speed and the high performance of the internal transfer of data between the PMR and NAND. Also, the reduction in the number of NAND accesses may also reduce the number of programming/erasing (P/E) operations on the NAND particles, which may extend the lifespan of the SSD.

Figure 10:
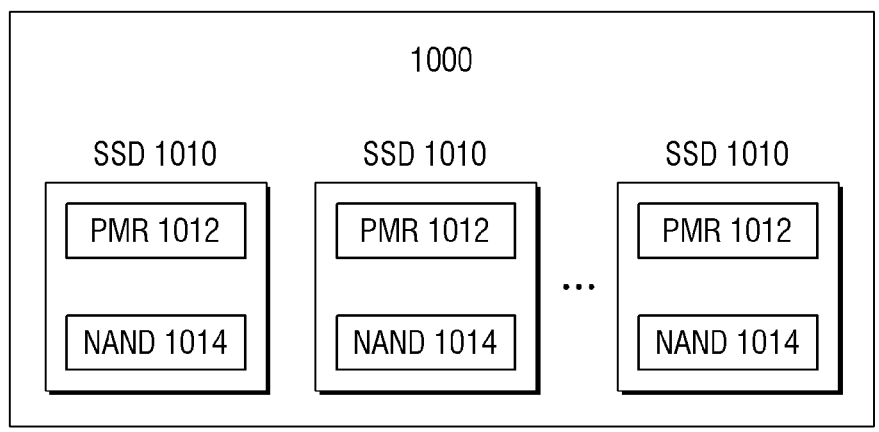
FIG. 10 illustrates an example of a RAID according to an example embodiment.

FIG. 10 illustrates an example of a RAID according to an example embodiment.

Referring to FIG. 10, a RAID system 1000 may include a plurality of SSDs 1010, where each SSD 1010 may include a PMR 1012 and a flash memory NAND 1014. The NAND may store first data and the PMR may store first check data, where the first check data is check data related to the first data.

According to an example embodiment, second data may be read in the NAND and second check data may be read, where the second check data is check data related to the second data and the second data is data which would be overwritten by the first data after the first data is written into the NAND. Then, the first check data may be calculated based on the second data, the second check data and the first data.

According to an example embodiment, the second check data may be read from the PMR in the case that second check data is in the PMR, and the second check data may be read from the NAND in the case that the second check data is not in the PMR.

According to an example embodiment, in the case that the second check data is not in the PMR and cache occupancy of the PMR is greater than or equal to a cache threshold, the data in the PMR satisfying a predetermined condition may be written into the NAND.

According to an example embodiment, a first xor result between the second data and the second check data may be calculated, and an xor result between the first xor and the first data may be calculated as the first check data.

According to the RAID in an example embodiment as described above, the PMR of each SSD in the RAID is used as a cache for the check data to reduce the access to the NAND, and to increase the read/write performance of the RAID by using the PMR's own memory-level read/write speed and the high performance of the internal transfer of data between the PMR and NAND. Also, the reduction in the number of NAND accesses may also reduce the number of programming/erasing (P/E) operations on the NAND particles, which may extend the lifespan of the SSD.

Figure 11:
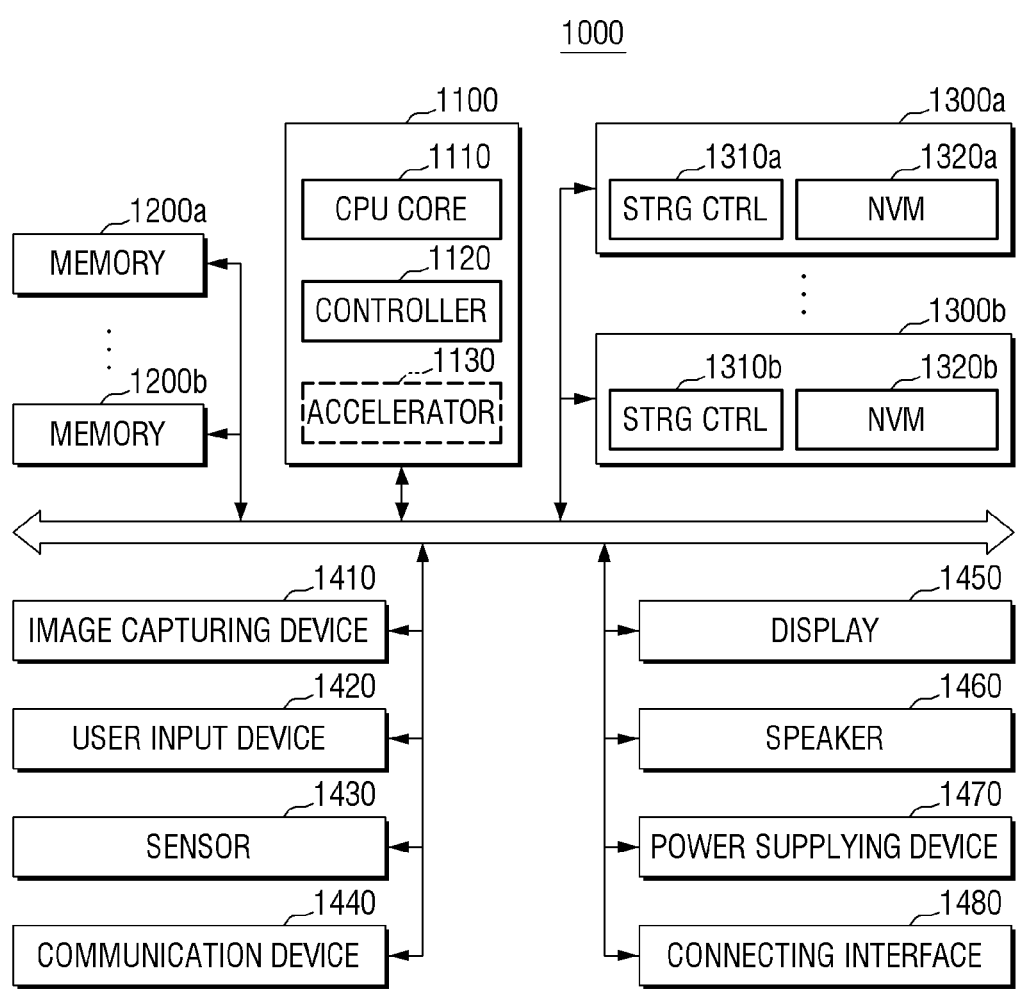
FIG. 11 is a diagram of a system to which a storage device is applied according to an example embodiment.

FIG. 11 is a diagram of a system 1000 to which a storage device is applied, according to an example embodiment.

The system 1000 of FIG. 11 may be, for example, a mobile system, such as a portable communication terminal (e.g., a mobile phone), a smartphone, a tablet personal computer (PC), a wearable device, a healthcare device, or an Internet of Things (IOT) device. However, the system 1000 of FIG. 11 is not necessarily limited to a mobile system, and may be, for example, a PC, a laptop computer, a server, a media player, or an automotive device (e.g., a navigation device).

Referring to FIG. 11, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, for example, operations of other components included in the system 1000. The main processor 1100 may be implemented as, for example, a general-purpose processor, a dedicated processor, or an application processor.

The main processor 1100 may include at least one CPU core 1110 and a controller 1120 configured to control the memories 1200a and 1200b and/or the storage devices 1300a and 1300b. In some example embodiments, the main processor 1100 may further include an accelerator 1130, which is a dedicated circuit for a high-speed data operation, such as, for example, an artificial intelligence (AI) data operation. The accelerator 1130 may include, for example, a graphics processing unit (GPU), a neural processing unit (NPU) and/or a data processing unit (DPU), and may be implemented as a chip that is physically separate from the other components of the main processor 1100.

The memories 1200a and 1200b may be used as main memory devices of the system 1000. Each of the memories 1200a and 1200b may include a volatile memory, such as, for example, static random access memory (SRAM) and/or dynamic RAM (DRAM), and each of the memories 1200a and 1200b may also include non-volatile memory, such as, for example a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include, for example, storage controllers (STRG CTRL) 1310a and 1310b and non-volatile memories (NVMs) 1320a and 1320b configured to store data via the control of the storage controllers 1310a and 1310b. The NVMs 1320a and 1320b may include flash memories having a two-dimensional (2D) structure or a three-dimensional (3D) V-NAND structure according to example embodiments, and the NVMs 1320a and 1320b may also include other types of NVMs, such as, for example, PRAM and/or RRAM according to example embodiments.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 1000 through an interface, such as the connecting interface 1480 that will be described below. The storage devices 1300a and 1300b may be devices to which a standard protocol, such as, for example, a universal flash storage (UFS), an embedded multi-media card (eMMC), or a non-volatile memory express (NVMe), is applied, without being limited thereto.

The image capturing device 1410 may capture still images or moving images. The image capturing device 1410 may include, for example, a camera, a camcorder, and/or a webcam.

The user input device 1420 may receive various types of data input by a user of the system 1000 and may include, for example, a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include, for example, a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include, for example, an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000, and is capable of transmitting and receiving data to and from the system 1000. The connecting interface 1480 may be implemented by using various interface schemes, such as, for example, advanced technology attachment (ATA), serial ATA (SATA), external SATA (e-SATA), small computer system interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The storage device (e.g., 1300a or 1300b) may be a RAID. According to an example embodiment of the disclosure, a system (e.g., 1000), to which a RAID is applied, is provided. The system includes a main processor (e.g., 1100), a memory (e.g., 1200a and 1200b), and the RAID (e.g., 1300a and 1300b), where the RAID is configured to perform the method of data storage as described above.

Figure 12:
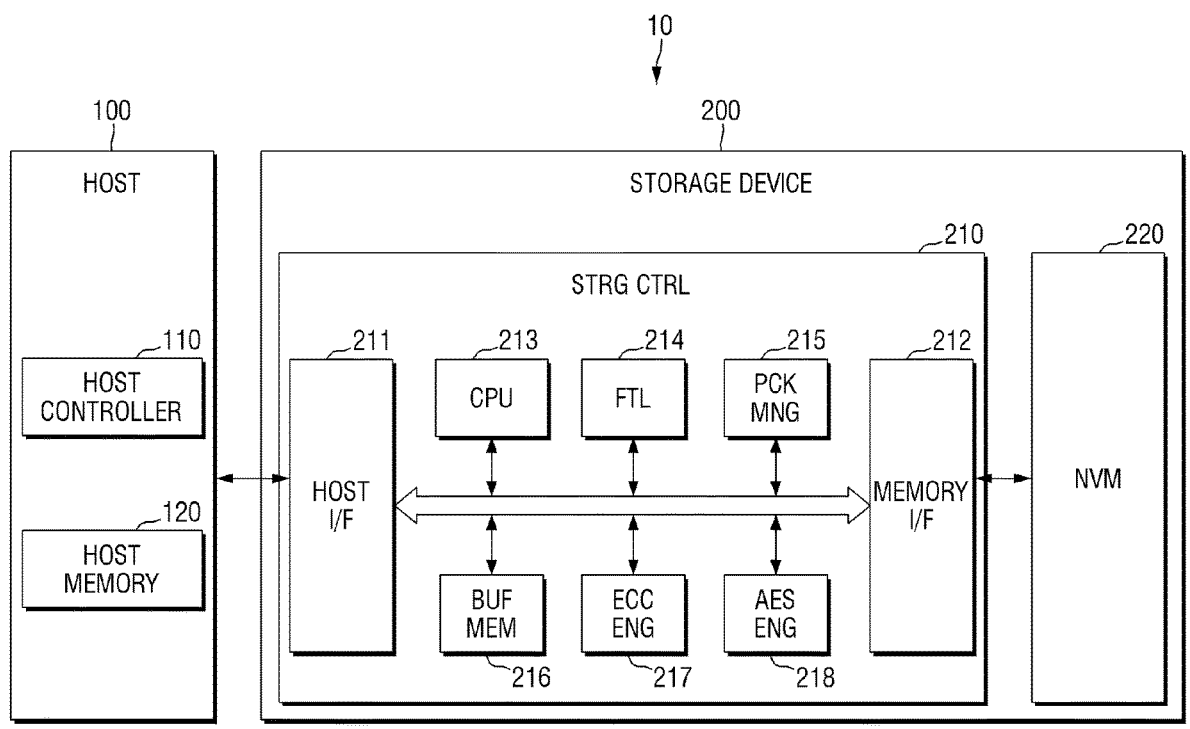
FIG. 12 is a block diagram of a host storage system according to an example embodiment.

FIG. 12 is a block diagram of a host storage system 10 according to an example embodiment.

The host storage system 10 may include a host 100 and a storage device 200. The storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an example embodiment, the host controller 110 and the host memory 120 may be implemented as separate semiconductor chips. Alternatively, in some example embodiments, the host controller 110 and the host memory 120 may be integrated in the same semiconductor chip. As an example, the host controller 110 may be any one of a plurality of modules included in an application processor (AP). The AP may be implemented as a system-on-chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, a CPU 213, a flash translation layer (FTL) 214, a packet manager 215, a buffer memory 216, an error correction code (ECC) engine 217, and an advanced encryption standard (AES) engine 218. The storage controllers 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as, for example, Toggle or open NAND flash interface (ONFI).

The FTL 214 may perform various functions, such as, for example, an address mapping operation, a wear-leveling operation, and a garbage collection operation. The address mapping operation may be an operation of converting a logical address received from the host 100 into a physical address used to actually store data in the NVM 220. The wear-leveling operation may be a technique that prevents or reduces excessive deterioration of a specific block by allowing blocks of the NVM 220 to be uniformly used. As an example, the wear-leveling operation may be implemented using a firmware technique that balances erase counts of physical blocks. The garbage collection operation may be a technique that may ensure usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. The buffer memory 216 may be a component included in the storage controllers 210, or may be disposed outside of the storage controllers 210.

The ECC engine 217 may perform error detection and correction operations on read data read from the NVM 220. For example, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

The storage device 200 may be a RAID. According to an example embodiment of the disclosure, a host storage system (e.g., 10) is provided, the host storage system includes a host (e.g., 100), and RAID (e.g., 200), where the RAID is configured to perform the method of data storage as described above.

Figure 13:
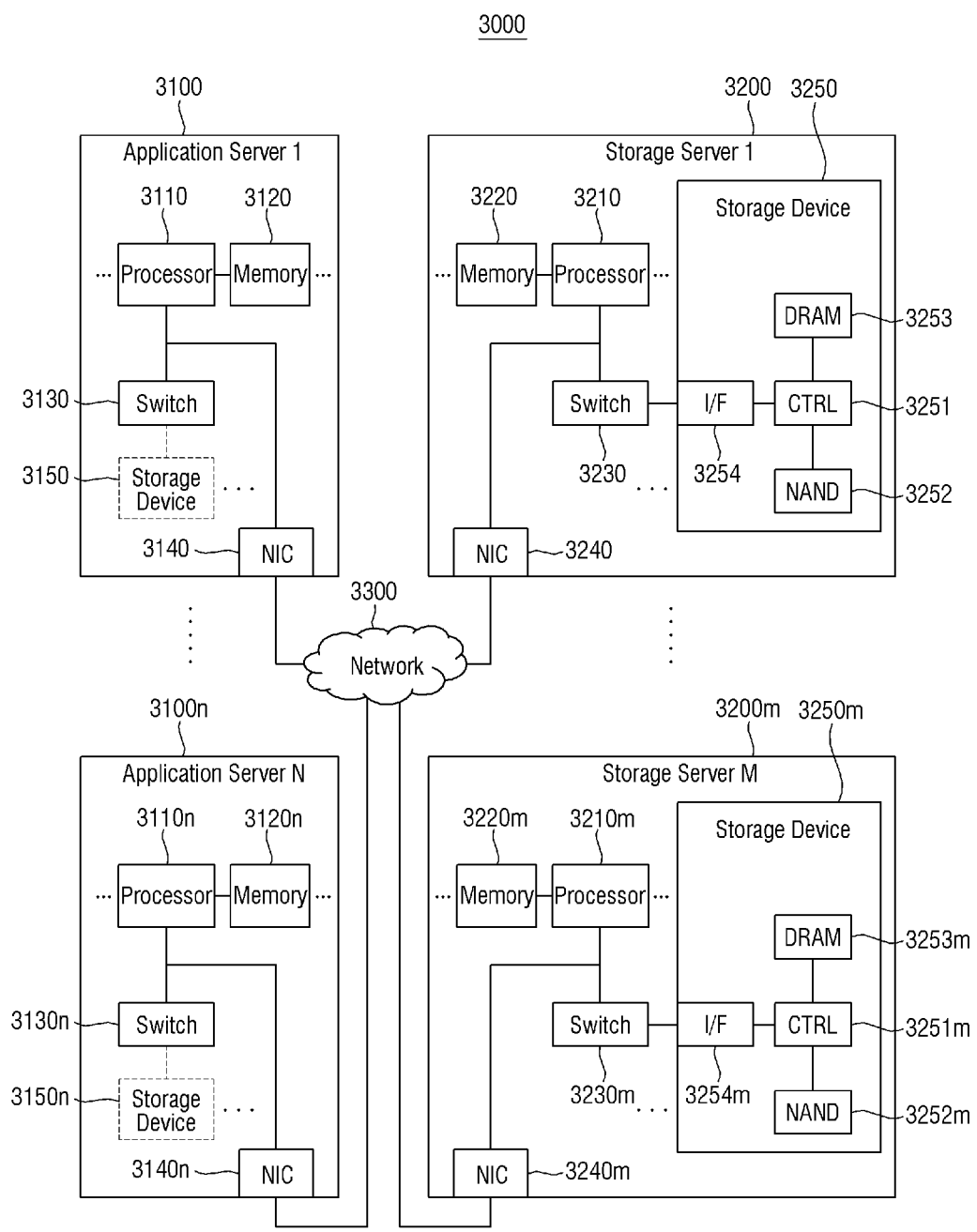
FIG. 13 is a diagram of a data center to which a memory device is applied according to an example embodiment.

FIG. 13 is a diagram of a data center 3000 to which a memory device is applied, according to an example embodiment.

Platform Portion—Server (Application/Storage)

Referring to FIG. 13, the data center 3000 may be a facility that collects various types of pieces of data and provides services, and may be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m, where n and m are positive integers. The number of application servers 3100 to 3100n and the number of storage servers 3200 to 3200m may be variously selected according to example embodiments. The number of application servers 3100 to 3100*n* may be different from the number of storage servers 3200 to 3200*m*.

The application server 3100 or the storage server 3200 may include at least one of processors 3110 and 3210 and memories 3120 and 3220. The storage server 3200 will now be described as an example.

The processor 3210 may control all operations of the storage server 3200, access the memory 3220, and execute instructions and/or data loaded in the memory 3220. The memory 3220 may be, for example, a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some example embodiments, the numbers of processors 3210 and memories 3220 included in the storage server 3200 may be variously selected. In an example embodiment, the processor 3210 and the memory 3220 may provide a processor-memory pair. In an example embodiment, the number of processors 3210 may be different from the number of memories 3220. The processor 3210 may include a single-core processor or a multi-core processor. The above description of the storage server 3200 may be similarly applied to the application server 3100. In some example embodiments, the application server 3100 does not include a storage device 3150. The storage server 3200 may include at least one storage device 3250. The number of storage devices 3250 included in the storage server 3200 may be variously selected according to example embodiments.

Platform Portion—Network

The application servers 3100 to 3100*n* may communicate with the storage servers 3200 to 3200*m* through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200*m* may be provided as, for example, file storages, block storages, or object storages according to an access method of the network 3300.

In an example embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In an example embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. A switch 3130 may connect the processor 3110 to the storage device 3150 in the application server 3100, and similarly, a switch 3130*n* may connect a processor 3110*n* to the storage device 3150*n* in the application server 3100*n*. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

Organic Relationship—Interface Structure/Type

The storage server 3200 will now be described as an example. A$_n$ interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the network interconnect (NIC) 3240. The switch 3230 may selectively connect the processor 3210 to the storage device 3250 or selectively connect the NIC 3240 to the storage device 3250 via the control of the processor 3210.

In an example embodiment, the NIC 3240 may include a network interface card and a network adaptor. The NIC 3240 may be connected to the network 3300 by, for example, a wired interface, a wireless interface, a Bluetooth interface, or an optical interface. The NIC 3240 may include, for example, an internal memory, a digital signal processor (DSP), and a host bus interface and be connected to the processor 3210 and/or the switch 3230 through the host bus interface. The host bus interface may be implemented as one of the above-described examples of the interface 3254. In an example embodiment, the NIC 3240 may be integrated with at least one of the processor 3210, the switch 3230, and the storage device 3250.

Organic Relationship—Interface Operation

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

Product Portion—SSD Basic Operation

The controller 3251 may control all operations of the storage device 3250. In an example embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy. Similar to the storage server 3200, the storage server 3200m may include a DRAM 3253m, a controller 3251m, an interface 3254m, a switch 3230m, and a NIC 3240m. The application server 3100 may include a network interface card (NIC) 3140, and the application server 3100n may include a network interface card (NIC) 3140n.

The storage device 200 may be a RAID. According to an example embodiment of the disclosure, a data center system (e.g., 3000) is provided, and the data center system includes a plurality of application servers (3100 to 3100n) and a plurality of storage servers (e.g., 3200 to 3200m), where each storage server includes a RAID, where the RAID is configured to perform the method of data storage as described above.

According to an example embodiment of the disclosure, a computer readable storage medium having a computer program stored thereon is provided, where the method of data storage as described above is implemented when the computer program is executed by a processor.

According to an example embodiment of the disclosure, an electronic apparatus is provided, including a processor and a memory storing a computer program, where the computer program when executed by the processor implements the method of data storage as described above.

According to example embodiments of the disclosure, a computer-readable storage medium may also be provided, where a computer program is stored thereon. When executed, the program may implement the method of data storage according to embodiments of the disclosure. Examples of computer-readable storage media herein include read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disk memory, hard disk drive (HDD), solid state drive (SSD), card-based memory (such as, multimedia cards, Secure Digital (SD) cards and/or Extreme Digital (XD) cards), magnetic tapes, floppy disks, magneto-optical data storage devices, optical data storage devices, hard disks, solid state disks, and/or any other device, where the other device is configured to store the computer programs and any associated data, data files, and/or data structures in a non-transitory manner and to provide the computer programs and any associated data, data files, and/or data structures to a processor or computer, so that the processor or computer may execute the computer program. The computer program in the computer readable storage medium may run in an environment deployed in a computer device such as, for example, a terminal, client, host, agent, server, etc., and furthermore, in one example, the computer program and any associated data, data files and/or data structures are distributed on a networked computer system such that the computer program and any associated data, data files and/or data structures are stored, accessed, and/or executed in a distributed manner by one or more processors or computers.

According to the method and device for data storage based on a RAID of example embodiments of the disclosure, the PMR of each SSD in RAID is used as a cache for the check data to reduce the access to the NAND, and to increase the read/write performance of the RAID by using the PMR's own memory-level read/write speed and the high performance of the internal transfer of data between the PMR and NAND. Also, the reduction in the number of NAND accesses also reduces the number of programming/erasing (P/E) operations on the NAND particles, which may extend the lifespan of the SSD.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A method of data storage based on a redundant array of independent disks (RAID), the method of data storage comprising:
    writing first data into a NAND among a plurality of NANDs,
    wherein the RAID comprises a plurality of solid state drives (SSD), and each SSD comprises a persistent memory region (PMR) and one of the NANDs; and
    caching first check data into the PMR of each SSD in the RAID,
    wherein the first check data is check data related to the first data, and the first check data is temporarily stored in the PMR of each SSD in the RAID,
    wherein before writing the first data into the NAND, the method of data storage comprises:
    reading second data in the NAND;
    reading second check data,
    wherein the second check data is check data related to the second data, and the second data is data overwritten by the first data after the first data is written into the NAND; and
    calculating the first check data based on the second data, the second check data, and the first data,
    wherein reading the second check data comprises:
    reading the second check data from the PMR when the second check data is in the PMR; and
    reading the second check data from the NAND when the second check data is not in the PMR.

2. The method of data storage of claim 1, wherein when the second check data is not in the PMR and a cache occupancy of the PMR is greater than or equal to a cache threshold, data in the PMR satisfying a predetermined condition is written into the NAND.

3. The method of data storage of claim 1, wherein calculating the first check data comprises:
    calculating a first xor result between the second data and the second check data; and
    calculating a second xor result between the first xor result and the first data as the first check data.

4. A system to which a redundant array of independent disks (RAID) is applied, comprising:
    a main processor;
    a memory; and
    the RAID;
    wherein the RAID is configured to perform the method of data storage according to claim 1.

5. A system to which a redundant array of independent disks (RAID) is applied, comprising:
    a main processor;
    a memory; and
    the RAID;
    wherein the RAID is configured to perform the method of data storage according to claim 1.

6. A system to which a redundant array of independent disks (RAID) is applied, comprising:
    a main processor;
    a memory; and
    the RAID;
    wherein the RAID is configured to perform the method of data storage according to claim 1.

7. A host storage system, comprising:
    a host; and
    a redundant array of independent disks (RAID);
    wherein the RAID is configured to perform the method of data storage according to claim 1.

8. A host storage system, comprising:
    a host; and
    a redundant array of independent disks (RAID);
    wherein the RAID is configured to perform the method of data storage according to claim 1.

9. A host storage system, comprising:
    a host; and
    a redundant array of independent disks (RAID);
    wherein the RAID is configured to perform the method of data storage according to claim 1.

10. A data center system, comprising:
    a plurality of application servers; and
    a plurality of storage servers;
    wherein each storage server comprises a redundant array of independent disks (RAID),
    wherein the RAID is configured to perform the method of data storage according to claim 1.

11. A data center system, comprising:
    a plurality of application servers; and
    a plurality of storage servers;
    wherein each storage server comprises a redundant array of independent disks (RAID),
    wherein the RAID is configured to perform the method of data storage according to claim 1.

12. A non-transitory computer readable storage medium having a computer program stored thereon, wherein the method of data storage according to claim 1 is implemented when the computer program is executed by a processor.

13. A non-transitory computer readable storage medium having a computer program stored thereon, wherein the method of data storage according to claim 1 is implemented when the computer program is executed by a processor.

14. A redundant array of independent disks (RAID), comprising:
    a plurality of solid state drives (SSD),
    wherein each SSD comprises a persistent memory region (PMR) and a NAND,
    wherein the NAND is configured to store first data, and wherein the PMR of each SSD in the RAID is configured to store cache first check data, wherein the first check data is check data related to the first data, and the first check data is temporarily stored in the PMR of each SSD in the RAID, wherein before the first data is stored in the NAND, the RAID is configured to:

read second data stored in the NAND;

read second check data, wherein the second check data is check data related to the second data, and the second data is data overwritten by the first data after the first data is stored in the NAND; and calculate the first check data based on the second data, the second check data, and the first data, wherein reading the second check data comprises:

reading the second check data from the PMR when the second check data is in the PMR; and reading the second check data from the NAND when the second check data is not in the PMR.

15. The RAID of claim 14, wherein when the second check data is not in the PMR and a cache occupancy of the PMR is greater than or equal to a cache threshold, data in the PMR satisfying a predetermined condition is written into the NAND.

16. The RAID of claim 14, wherein a first xor result between the second data and the second check data is calculated; and a second xor result between the first xor result and the first data is calculated as the first check data.

* * * * *

UNITED STATES PATENT AND TRADEMARK OFFICE
CERTIFICATE OF CORRECTION

| | | |
|---|---|---|
| PATENT NO. | : 12,386,565 B2 | Page 1 of 1 |
| APPLICATION NO. | : 18/365104 | |
| DATED | : August 12, 2025 | |
| INVENTOR(S) | : Peiwei Li and Ruyi Zhang | |

It is certified that error appears in the above-identified patent and that said Letters Patent is hereby corrected as shown below:

On the Title Page

Item [30], add:
-- Foreign Application Priority Data
June 14, 2023 (CN) ............. 202310706580.5 --

Signed and Sealed this
Twenty-eighth Day of October, 2025

John A. Squires
*Director of the United States Patent and Trademark Office*